(12) United States Patent
Tokuda et al.

(10) Patent No.: US 7,198,670 B2
(45) Date of Patent: Apr. 3, 2007

(54) METHOD OF FABRICATING BOARD HAVING PERIODICALLY POLED REGION

(75) Inventors: Katuhiko Tokuda, Atsugi (JP); Kazutomo Kadokura, Atsugi (JP)

(73) Assignee: Shimadzu Corporation, Kyoto-shi (JP)

( * ) Notice: Subject to any disclaimer, the term of this patent is extended or adjusted under 35 U.S.C. 154(b) by 267 days.

(21) Appl. No.: 11/038,990

(22) Filed: Jan. 20, 2005

(65) Prior Publication Data

US 2005/0181525 A1    Aug. 18, 2005

(30) Foreign Application Priority Data

Jan. 21, 2004    (JP) .............................. 2004-012784

(51) Int. Cl.
*C30B 33/06* (2006.01)
(52) U.S. Cl. ................. 117/2; 117/3; 117/902
(58) Field of Classification Search ...... 117/2, 117/3, 902
See application file for complete search history.

(56) References Cited

FOREIGN PATENT DOCUMENTS

| JP | 2969787 | 8/1999 |
|----|---------|--------|
| JP | 3059080 | 4/2000 |
| JP | 2002-72266 | 3/2002 |

*Primary Examiner*—Felisa Hiteshew

(74) *Attorney, Agent, or Firm*—Rankin, Hill, Porter & Clark LLP

(57) ABSTRACT

A polarization inverting region is formed by using a board comprising a single crystal of lithium tatalate of a stoichiometric composition or near to the stoichiometric composition and applying a direct current electric field having an electric field intensity equal to or lower than 5 [kV/mm] for 1 [second] or longer. A periodically poled region can be formed without needing a complicated constitution for applying a pulse voltage or a complicated constitution for applying a strong electric field.

3 Claims, 2 Drawing Sheets

METHOD OF FABRICATING BOARD HAVING PERIODICALLY POLED REGION

BACKGROUND OF THE INVENTION

1. Field of the Invention

The present invention relates to a method of fabricating a board having a periodically poled region, more in details, relates to a method of fabricating a board having a periodically poled region capable of fabricating a board having a periodically poled region without needing a complicated constitution for applying a pulse voltage or a complicated constitution for applying a strong electric field.

2. Description of the Related Art

In a related art, there is known a technology of providing a periodic domain inverting structure by forming a periodic electrode on a surface of a lithium niobate board (CLN board) having a congruent constitution, forming a plane electrode on a rear face thereof, and applying, for example, an electric field of 40 [kV/cm] and a pulse of a pulse width of 0.1 [second] two times (refer to, for example, Japanese Patent Publication No. 2969787 (7 column, 30 line through 8 column, 34 line) which is hereinafter referred as Patent Reference 1).

Further, there is known a technology of providing a periodically poled structure by forming a periodic electrode on a surface of a lithium niobate board (CLN board) or a lithium tantalate board (CLT board) having a congruent constitution, forming a plane electrode on a rear face thereof, and superposing a pulse voltage of a pulse width of 5 [μ second] and a direct current voltage to constitute a synthesized electric field of about 21 [kV/mm] so as to apply the synthesized electric field to these electrodes (refer to, for example, Japanese Patent Publication No. 3059080 ([0033] through [0047] [0060] [0066]) which is hereinafter referred as Patent Reference 2).

Further, there is known a technology of inverting polarization by forming a periodic electrode on a surface of a board comprising lithium tantalate near to a Ta excess or Li excess stoichiometric composition, forming a plane electrode on a rear face, and applying a pulse voltage of, for example, an electric field of several tens [kV/mm] in the case of the Ta excess board, or an electric field of about 0.5 through 4 [kV/mm] in the case of the Li excess board to these electrodes (refer to, for example, JP-A–2002-72266 ([0020] [0023] [0062] [0063] [0078] [0090]) which is hereinafter referred as Patent Reference 3).

It is necessary to apply a pulse voltage in any of the above–described related arts, and there poses a problem of needing a complicated constitution for applying the pulse voltage (power source or the like capable of outputting the pulse voltage of a short pulse width).

Further, although in [0040] through [0043] of Patent Reference 2, an example of applying only a direct current voltage is explained, a direct current electric field equal to or higher than about 20 [kV/mm] is applied and there poses a problem of needing a complicated constitution of applying a strong electric field (power source or the like capable of outputting a high voltage).

SUMMARY OF THE INVENTION

Hence, it is an object of the invention to provide a method of fabricating a board having a periodically poled region capable of fabricating a board having a periodically poled region without needing a complicated constitution for applying a pulse voltage or a complicated constitution for applying a strong electric field.

According to a first aspect of the invention, there is provided a method of fabricating a board having a periodically poled region, the method comprising:

forming electrodes at a +C face and a −C face of a board comprising a single crystal of lithium tantalate of a stoichiometric composition or near to the stoichiometric composition of a singly polarized C plate, at least one of the electrodes constituting a periodic electrode; and applying a direct current electric field having an electric field intensity equal to or lower than 5 [kV/mm] between the electrodes for 1 [second] or longer to form the periodically poled region on the board.

In a related art, it has been conceived necessary to apply a pulse voltage since a polarization inverting region portion formed right below a periodic electrode is widened at a fast speed in a lateral direction (refer to [0043] of Patent Reference 2).

However, as a result of an intensive research by the inventors of the application, it has been found that in a board comprising a single crystal of lithium tantalate of a stoichiometric composition or near to a stoichiometric composition of a singly polarized C plate, a speed of widening a polarization inverting region portion in a lateral direction is far slower than that conceived in the related art, and a board having a periodically poled region can preferably be fabricated even by applying only a direct current electric field to complete the invention.

That is, in the method of fabricating the board having the periodically poled region according to the first aspect of the invention, the polarization inverting region is formed by using the board comprising the single crystal of lithium tantalate of the stoichiometric composition or near to the stoichiometric composition and applying the direct current electric field having the electric field intensity equal to or lower than 5 [kV/mm] for 1 [second] or longer. Therefore, a complicated constitution for applying a pulse voltage or a complicated constitution for applying a strong electric field is not needed. Then, the periodically poled region as shown by embodiments, mentioned later, can be formed.

According to a second aspect of the invention, in the above–described method of fabricating a board having a polarization inverting region, there is provided the method of fabricating a board having a periodically poled region wherein a molar ratio of $Li_2O/(Ta_2O_5+Li_2O)$ of the board is equal to or larger than 0.495 and smaller than 0.505.

In the method of fabricating the board having the periodically poled region according to the second aspect of the invention, as shown by embodiments, mentioned later, the periodically poled region can preferably be formed.

According to a third aspect of the invention, in the above–described method of fabricating a board having a polarization inverting region, there is provided the method of fabricating a board having a periodically poled region wherein a molar ratio of $Li_2O/(Ta_2O_5+Li_2O)$ of the board is equal to or larger than 0.495 and smaller than 0.505 and the board is doped with at least one kind of Mg, Zn, Sc and In.

As shown by embodiments, mentioned later, by doping Mg, a necessary electric field intensity can be reduced.

Hence, in the method of fabricating a board having a periodically poled region according to the third aspect of the invention, Mg or at least one kind of Zn, Sc and In equivalent thereto is doped. Thereby, the necessary electric field intensity can be reduced.

According to the method of fabricating the board having the periodically poled region of the invention, the board having the periodically poled region can be fabricated without needing a complicated constitution for applying a pulse voltage or a complicated constitution for applying a strong electric field.

DETAILED DESCRIPTION OF THE INVENTION

Figure 1:
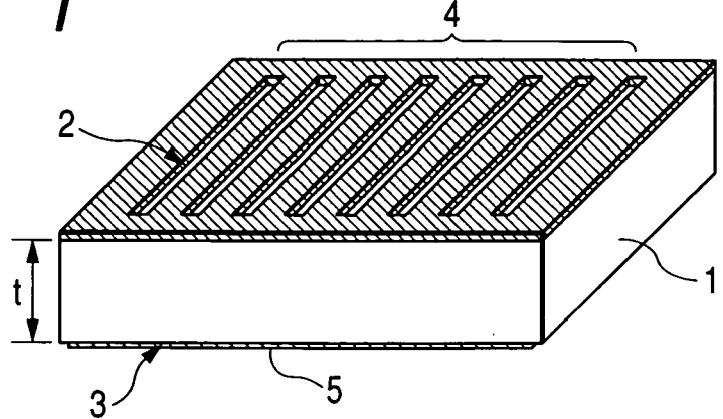
FIG. 1 is a perspective view showing a board formed with a periodic electrode and a solid electrode.

The invention will be explained further in details by embodiments shown in the drawings as follows. Further, the invention is not limited thereby.

[Embodiment 1]

FIG. 1 is a perspective view showing a state of forming a periodic electrode 4 and a solid electrode 5 at a board 1.

The board 1 comprises a single crystal of lithium tantalate of a stoichiometric composition or near to a stoichiometric composition of a singly polarized C plate having a molar ratio of $Li_2O/(Ta_2O_5+Li_2O)$ equal to or larger than 0.495 and smaller than 0.505 and doped with MgO. A thickness of the board 1 is t=0.4 [mm].

The periodic electrode 4 and the solid electrode 5 are formed as follows.

(1) A film of an electrode metal of, for example, Ta or the like is formed at +C face 2 and −C face 3 of the board 1.

Figure 2:
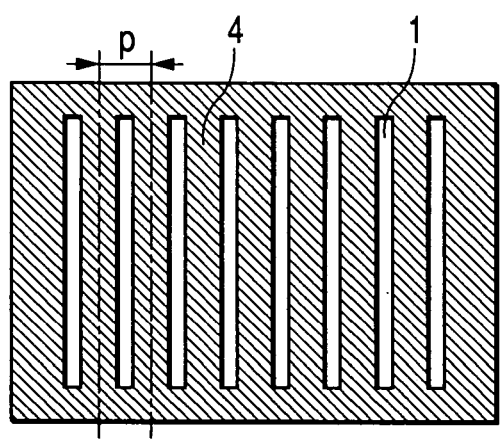
FIG. 2 is a top view showing a periodic electrode.

(2) As shown by FIG. 2, by subjecting the film of the electrode metal formed at +C face to photolithogic machining and etching, the periodic electrode 4 having, for example, a period p=8 [µm] is formed.

Figure 3:
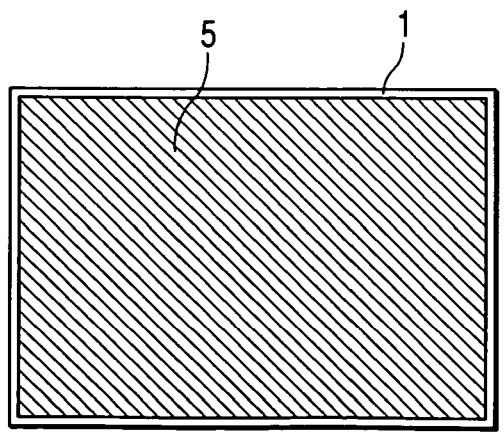
FIG. 3 is a bottom view showing a solid electrode.

(3) As shown by FIG. 3, by subjecting a film of the electrode metal formed at −C face to the photolithogic machining and etching, the solid electrode 5 having a necessary area is formed.

Figure 4:
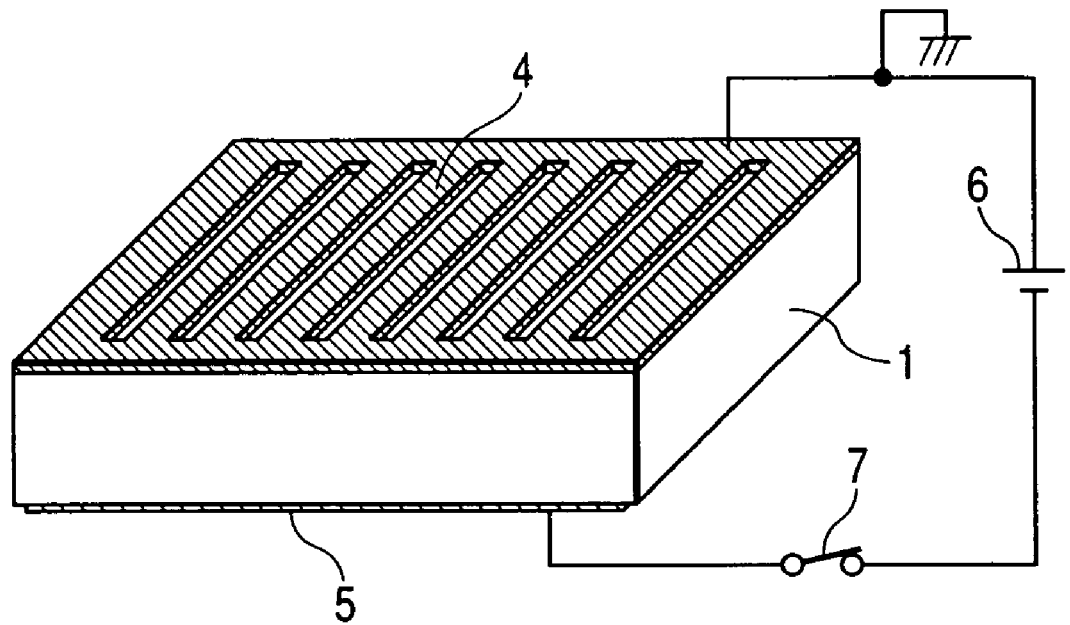
FIG. 4 is an explanatory view showing a procedure of applying a direct current voltage to a board.
Figure 5:
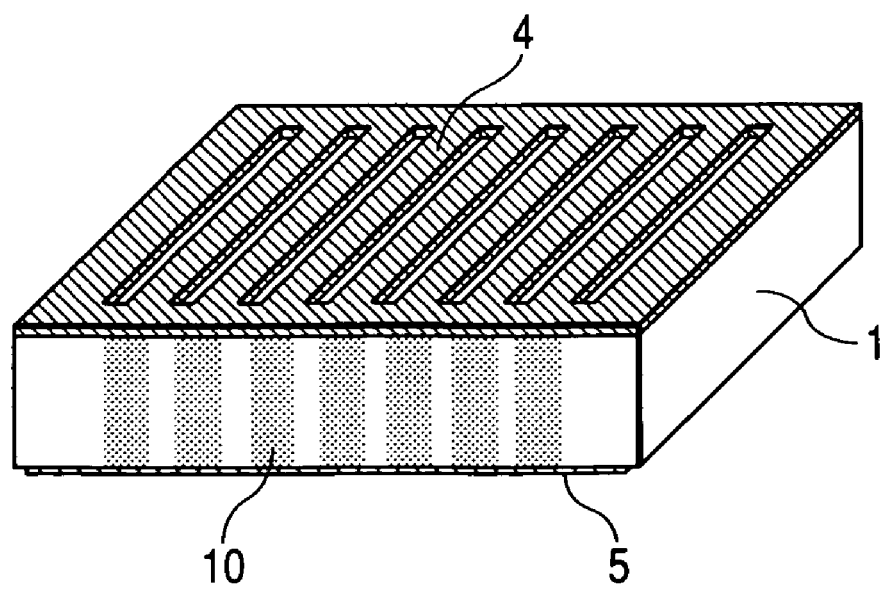
FIG. 5 is a perspective view showing a board having a polarization inverting structure.

FIG. 4 is an explanatory view showing a procedure of forming a periodically poled region.

In a state of dipping the board 1 in an insulating oil, a switching circuit 7 is made ON for 20 [second] and a direct current voltage of 0.4 [kV] is applied from a direct current power source 6 to the periodic electrode 4 and the solid electrode 5 (electric field intensity of 1 [kV/mm]).

According to Embodiment 1, a polarization inverting structure is provided by a uniform period over a total of a region for applying the direct current voltage.

[Embodiment 2]

A time period for applying the direct current voltage (a time period of making the switching circuit 7 ON) is set to 1 [second], 5 [second], 10 [second], 30 [second] and other condition is made to stay the same as that of Embodiment 1.

According to Embodiment 2, the polarization inverting structure is provided by a uniform period over a total of the region of applying the direct current voltage by any time period equal to or longer than 1 [second]. Further, the longer the time period of applying the direct current voltage, the larger a duty ratio (a rate of a polarization inverting region 10 occupied in the polarization inverting structure) of the polarization inverting structure. However, it has been found that a change in the duty ratio as compared with a change in the time period of applying the direct current voltage is small and the duty ratio can be adjusted with sufficient accuracy even when the time period of applying the direct current voltage is controlled at an order of several tens [second]. Incidentally, according to the method of the related art of applying the pulse voltage, in order to adjust the duty ratio with necessary accuracy, it is necessary to control the pulse width at an order of several hundreds [µ second].

[Embodiment 3]

The direct current power source 6 is set to a direct current voltage of 0.2 [kV] (electric field intensity of 0.5 [kV/mm]), a time period of applying the direct current voltage is set to 180 [second] and other condition is made to stay the same as that of Embodiment 1.

According to Embodiment 3, the polarization inverting structure is provided at a uniform period over a total of the region of applying the direct current voltage.

COMPARATIVE EXAMPLE 1

The time period of applying the direct current voltage is set to 20 [second], 40 [second], 90 [second] and other condition is made to stay the same as that of Embodiment 3.

According to Comparative Example 1, the polarization inverting structure of the uniform period over the total of the region of applying the direct current voltage cannot be provided.

It is known from a result of Embodiment 3 and a result of Comparative Example 1 that when the electric field intensity is reduced, a time period of applying the direct current voltage may be extended.

[Embodiment 4]

The period of the period electrode 4 is made to be as short as p=5.5 [µm] and other condition is made to stay the same as that of Embodiment 1.

According to Embodiment 4, even when the period is made to be as short as 5.5 [µm], the polarization inverting structure is provided by a uniform period over the total of the region of applying the direct current voltage.

COMPARATIVE EXAMPLE 2

A pulse voltage of a voltage of 2 [kV] superposed on a direct current voltage of 0.4 [kV] and a pulse width of 1 [msecond] is applied one time and other condition is made to stay the same as that of Embodiment 4.

A polarization inverting structure equivalent to that of Embodiment 4 can be formed even by Comparative Example 2.

A significance of applying the pulse voltage is not recognized from a result of Embodiment 4 and a result of Comparative Example 2.

[Embodiment 5]

The board 1 is brought into an atmospheric environment and other condition is made to stay the same as that of Embodiment 4.

According to Embodiment 5, a polarization inverting structure equivalent to that of Embodiment 4 can be formed. That is, it is found that when the electric field intensity is to a degree of about 1 [kV/mm], the structure is not hindered by the atmospheric environment.

[Embodiment 6]

As the board 1, a single crystal of lithium tantalate of a stoichiometric composition or near to a stoichiometric composition of a singly polarized C plate having a molar ratio of li$_2$O/(Ta$_2$O5+Li$_2$O) equal to or larger than 0.495 and smaller than 0.505 and not doped with MgO is used, the direct current power source 6 is set to a direct current voltage of 1.2 [kV] (electric field intensity of 3 [kV/mm]) and other condition is made to stay the same as that of Embodiment 4.

According to Embodiment 6, the polarization inverting structure is provided by the uniform period over the total of the region of applying the direct current voltage.

COMPARATIVE EXAMPLE 3

The direct current voltage is set to 2.4 [kV] (electric field intensity of 6 [kV/mm]) and other condition is made to stay the same as that of Embodiment 6.

According to Comparative Example 3, the polarization inverting structure by the uniform period over the total of the region of applying the direct current voltage cannot be provided.

From a result of Embodiment 6 and a result of Comparative Example 3, in order to provide the polarization inverting structure at the uniform period over the total of the region of applying the direct current voltage, it seems to be proper to make the electric field intensity to be equal to or smaller than 5 [kV/mm].

[Embodiment 7]

Although also a case of forming an SiO$_2$ insulating film further on the periodic electrode 4 in (3) of Embodiment 1, mentioned above, and making other condition stay the same as those of Embodiment 1 through Embodiment 6, mentioned above, is executed, there is not particularly a difference between a result of Embodiment 7 and results of Embodiment 1 through Embodiment 6, mentioned above, which are not formed with the SiO$_2$ insulting film.

The board having the periodically poled structure fabricated by the invention can be utilized as, for example, an optical function element in a semiconductor excited solid laser using an SHG (second harmonics generating) wavelength converting technology. Further, the board executes a wide range of wavelength shifting as quasi–phase machining (QPM) device and can be utilized in an optical communication field of wavelength division multiplexing (WDM) or the like.

What is claimed is:

1. A method of fabricating a board having a periodically poled region, the method comprising:
    forming electrodes at a +C face and a −C face of a board comprising a single crystal of lithium tantalate of a stoichiometric composition or near to the stoichiometric composition of a singly polarized C plate, at least one of the electrodes constituting a periodic electrode; and
    applying a direct current electric field having an electric field intensity equal to or lower than 5 [kV/mm] between the electrodes for 1 [second] or longer to form the periodically poled region on the board.

2. The method of fabricating a board having a periodically poled region according to claim 1, wherein a molar ratio of Li$_2$O/(Ta$_2$O$_5$+Li$_2$O) of the board is equal to or larger than 0.495 and smaller than 0.505.

3. The method of fabricating a board having a periodically poled region according to claim 1, wherein a molar ratio of Li$_2$O/(Ta$_2$O$_5$+Li$_2$O) of the board is equal to or larger than 0.495 and smaller than 0.505 and the board is doped with at least one kind of Mg, Zn, Sc and In.

* * * * *